(12) United States Patent
Brunner

(10) Patent No.: US 7,703,450 B2
(45) Date of Patent: Apr. 27, 2010

(54) QUICK DRAWER CHANGE SYSTEM

(75) Inventor: Robert Brunner, San Francisco, CA (US)

(73) Assignee: Fuego North America LLC, San Francisco, CA (US)

( * ) Notice: Subject to any disclaimer, the term of this patent is extended or adjusted under 35 U.S.C. 154(b) by 235 days.

(21) Appl. No.: 11/788,535

(22) Filed: Apr. 20, 2007

(65) Prior Publication Data

US 2008/0257334 A1 Oct. 23, 2008

(51) Int. Cl.
*F24C 3/00* (2006.01)
*F24C 3/12* (2006.01)

(52) U.S. Cl. .................. 126/39 R; 126/41 R; 126/25 R; 126/39; 126/25 A; 126/41 D; 431/147; 137/495

(58) Field of Classification Search ............... 126/39 R, 126/41 R, 25 R, 25 A, 42, 41 D; 431/147; 137/495
See application file for complete search history.

(56) References Cited

U.S. PATENT DOCUMENTS

| | | | | |
|---|---|---|---|---|
| 3,130,719 A | * | 4/1964 | Mayer et al. ............... | 126/37 B |
| 3,682,157 A | * | 8/1972 | Perl .......................... | 126/37 B |
| 4,709,687 A | * | 12/1987 | Barnes ........................ | 126/42 |
| 4,899,725 A | * | 2/1990 | Barron, Jr. ................. | 126/41 R |
| 6,000,389 A | * | 12/1999 | Alpert ....................... | 126/25 R |
| 6,166,353 A | * | 12/2000 | Senneville et al. .......... | 219/385 |

* cited by examiner

*Primary Examiner*—Steven B McAllister
*Assistant Examiner*—Nikhil Mashruwala
(74) *Attorney, Agent, or Firm*—Dergosits & Noah LLP

(57) ABSTRACT

A grill that includes a base and, residing thereupon, a cooking surface in the form of a grate for supporting food to be cooked by the grill. A first removable drawer is positionable beneath the grate having at least one burner. A source of combustible fuel, such as a pressurized gas, is contained within a tank located within the base of the grill. A fuel line emanating from the pressurized tank terminates at a control valve having a first gas transmitting position facilitating the combustible fuel fed to the at least one burner and a second gas blocking position preventing the combustible fuel to be fed to the at least one burner. The control valve is capable of assuming the first gas transmitting position only if the first removable drawer has been fully positioned beneath the cooking surface. When an alternative drawer, such as one containing charcoal is employed, fuel from the pressurized tank is blocked from emanating from the tank.

9 Claims, 2 Drawing Sheets

QUICK DRAWER CHANGE SYSTEM

TECHNICAL FIELD

The present invention involves a grill, such as a portable grill commonly employed in domestic installations. The present grill is capable of using alternative fuel sources, such as a pressurized gas (propane) as well as traditional charcoal. This invention employs a safety feature enabling a user to transfer between alternative fuel sources without concern as to any safety hazard resulting from the introduction of combustible pressurized gas when charcoal or other alternative fuels are employed.

BACKGROUND OF THE INVENTION

Barbeque grilling is a very popular past time combining a social get together with a unique cooking experience. Historically, virtually all barbequing was conducted using charcoal or other solid fuel sources. More recently, gas grilling has gained in popularity because of its relative ease of use noting that gas is available instantaneously not requiring a liquid fire starter and charcoal prepping. Nevertheless, many of those who engage in outdoor grilling still prefer charcoal sources, as it is generally believed that charcoal adds to the flavor of the cooked product.

As noted, there are drawbacks in employing charcoal as a fuel for grilling. Charcoal burns hotter than alternative fuel sources and, as a consequence, uneven cooking and flame up due to greases, oils and similar flammable liquids is always a potential. It is also difficult to control the temperature of a charcoal fuel source noting that, initially, charcoal provides an inadequate source but when properly combusted, charcoal can generate impressively high temperatures.

Gas sources such as propane are available commercially. Propane is generally housed within a pressurized tank as a liquid and is fed directly to a burner using metering controls generally provided with most outdoor grills. As such, a gas fed grill operates much like a conventional stovetop providing the user with a clean and efficient cooking environment albeit one that does not offer the traditional grilling experience and flavor achievable only through the use of charcoal.

Recognizing the advantages available through the use of charcoal and propane gas, it has been suggested that a universal grill have the ability to switch between the two fuel sources depending upon the wishes of a user. Great care, however, must be exercised in doing so for one would not wish to continuously employ a gaseous fuel source when using charcoal. As a consequence, one wishing to shuttle between charcoal and propane would generally be encouraged to access the pressurized propane tank and physically close the valve sitting on top of the tank to manually disrupt gas flow, which would otherwise feed a burner. However, if one, through inadvertence, failed to close the pressurized tank when using charcoal, a dangerous situation could ensue where the combination of gas and charcoal could cause dangerous flare-ups and consequent significant injury to a user.

Furthermore, one would generally not wish to simply add charcoal to a propane burner element as the debris from the charcoal in terms of ash and unconsumed carbon would foul the burning element resulting in uneven and disrupted gas flow once a user was to convert from charcoal back to gas fired burners.

It is thus an object of the present invention to provide a grill capable of operating on either pressurized gas or charcoal and yet overcomes the disadvantages as described above.

These and further objects will be more readily apparent when considering the following disclosure and appended claims.

SUMMARY OF THE INVENTION

A grill comprising a base and residing thereupon, cooking surface, said cooking surface comprising at least one grate for supporting food to be cooked by said grill. A first removable drawer is positionable beneath the grate, the first removable drawer having at least one burner. A source of combustible fuel is contained within a pressurized tank, the pressurized tank being housed within the base and having a fuel line emanating from said pressurized tank to a control valve. The control valve is characterized as having a first gas transmitting position facilitating the flow of the combustible fuel to said at least one burner and a second gas blocking position preventing the combustible fuel to be fed to said at least one burner, the control valve being capable of assuming said first gas transmitting position only if said first removable drawer has been fully positioned beneath said cooking surface.

DETAILED DESCRIPTION OF THE INVENTION

Figure 1:
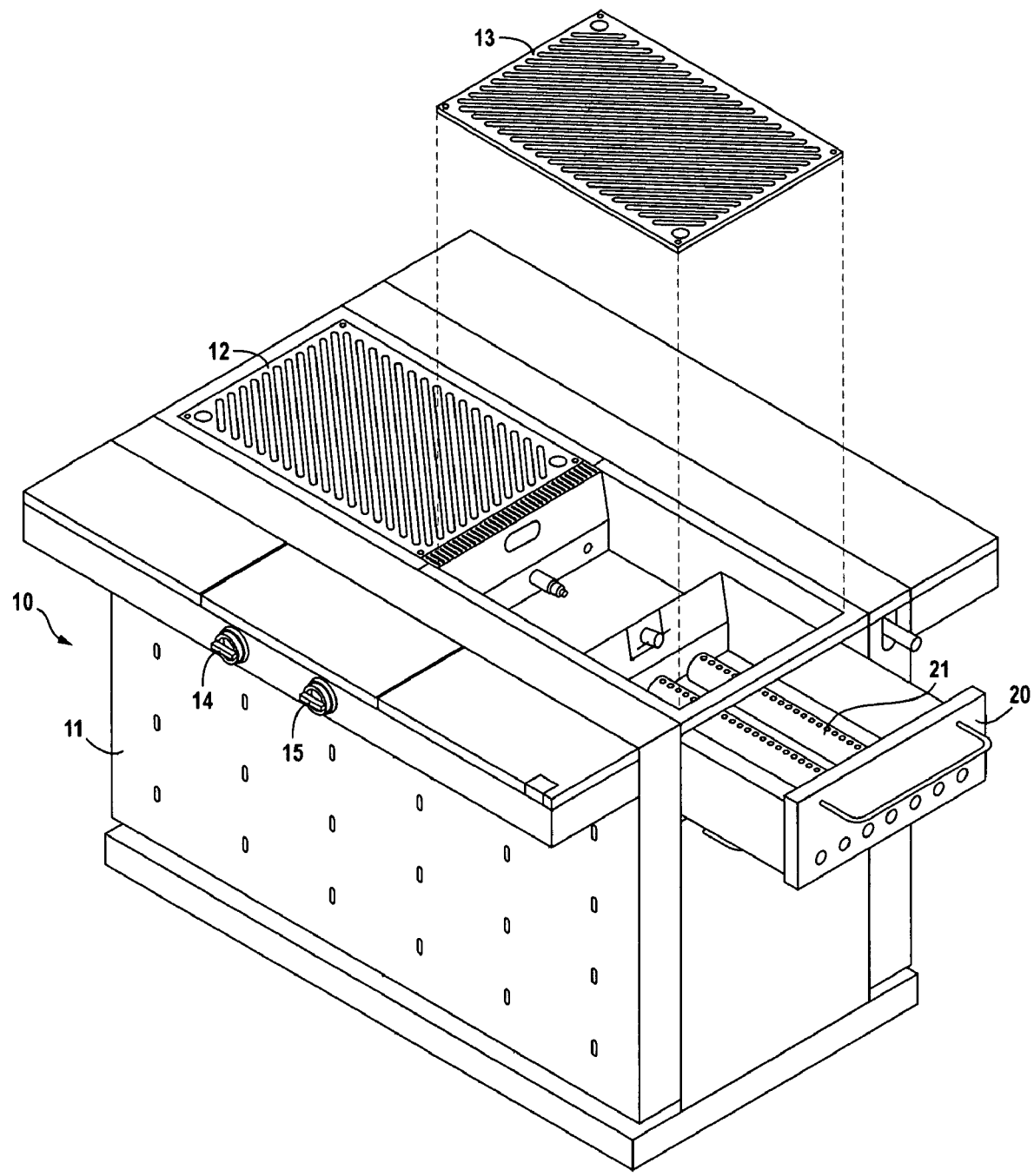
FIG. 1 is a perspective view of the grill of the present invention.

As noted previously, the present invention involves a grill capable of employing both gas and charcoal or other fuel sources interchangeably in a safe and convenient manner. Grill 10 is depicted generally having base 11, grates 12 and 13, the latter acting as cooking surfaces and controls 14 and 15. These controls meter gas maintained in pressurized container 16 (FIG. 2) located within base 11 by metering the gas, such as propane through feed line 19. Pressurized gas contained within tank 16 feeds gas supply fixture 18 through valve 17, gas feed line 19 and into burner element 21.

Figure 2:
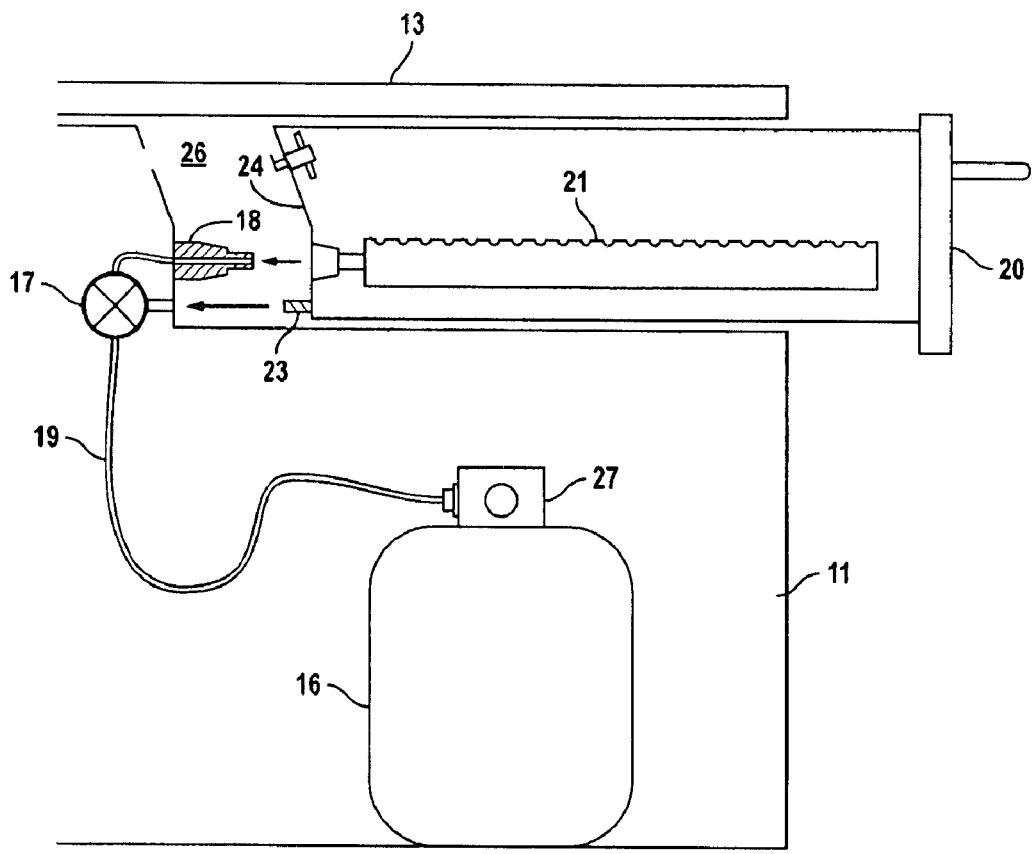
FIG. 2 is a side cut away view of the grill base, pressurized tank, valve and first drawer employed in practicing the present invention.

As noted in reference to FIG. 2, first drawer 20 is slidable within grill 10 beneath cooking surface 13. Drawer 20 housing gas burners 21 is situated beneath grate 13 to supply heat to food products situated upon grill 13. Again, the metering of gas through burners 21 is controlled by either control elements 14 or 15 noting that, in the embodiment shown in FIG. 1, a parallel drawer and burners would also be situated beneath grate 12.

Referring once again to FIG. 2, it is noted that rear surface 24 of drawer 20 is provided with extension 23. In practicing the present invention, valve 17 is designed to receive extension 23 only when first removable drawer 20 is fully inserted within drawer opening 26. When extension 23 is received by valve 17, valve 17 opens to enable pressurized gas to proceed along line 19 and into gas supply fixture 18 which results in gas being fed to burner 21. Conversely, when drawer 20 is even partially removed from drawer opening 26, extension 23 is removed from valve 17 causing valve 17 to close blocking the supply of gas through line 19. As such, pressurized gas contained within tank 16 can only be fed to gas supply fixture 18 if first drawer 20 supporting extension 23 on rear surface 24 is employed. As a consequence, when drawer 20 is removed, pressurized gas within tank 16 will be blocked from gas supply fixture 18 without having to reach within base 11 to manually close the supply valve contained atop tank 16 in housing 27. Even if one was to inadvertently turn feed valve 15 when first drawer 20 was not in place, no gas would be fed to gas supply fixture 18.

Figure 3:
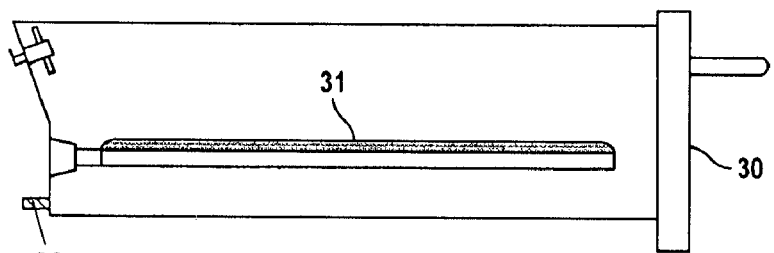
FIG. 3 is a side cut away view of an alternative first drawer to that shown in FIG. 2.

Turning to FIG. 3, drawer 30 is a second variation of first drawer 20 differing only in the provision of a ceramic burner as an alternative to the sheet metal burner 21 of FIG. 2. Element 31 acts to radiate heat to the cooking surface rather than providing an open flame. In either case, because element 31 also employs a source of pressurized combustible gas, removable drawer 30 is provided with extension 33 which again engages valve 17 in order to selectively open line 19 to the introduction of the gas to element 31 through gas supply fixture 18.

Figure 4:
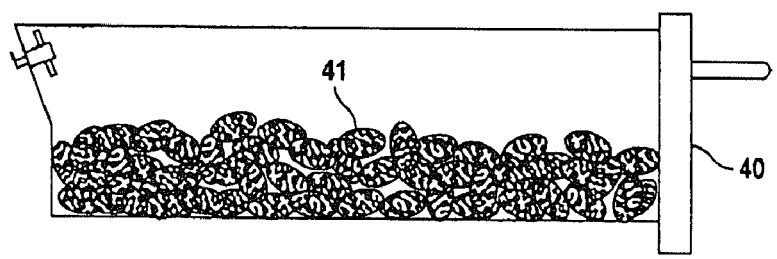
FIG. 4 is a side cut away view of a second drawer, one used to contain charcoal as a fuel source.

As noted previously, it is fundamental to the present invention that a user of grill 10 be able to employ charcoal or other solid fuel sources in place of pressurized gas beneath grates 12 and 13. In this regard, reference is made to FIG. 4 depicting drawer 40 containing charcoal 41 therein. As noted, drawer 40 is sized to fit within opening 26 once drawers 20 or 30 have been removed therefrom. Drawer 40 is able to contain charcoal 41 enabling charcoal 41 to combust therein acting as a self-contained heat source. This provides for a high level of convenience for as charcoal 41 is consumed, a user of grill 10 need only remove drawer 40 by sliding it out of opening 26 to then dump the charcoal embers in a suitable receptacle.

It is noted that rear surface 44 of drawer 40 is devoid of extension 23/33 or any substitute therefore. In failing to provide a suitable extension on rear surface 44, valve 17 would remain closed and, thus, pressurized gas contained within tank 16 will not proceed along line 19 and into gas supply fixture 18. Thus, the supply of combustible pressurized gas is automatically disrupted at any time drawer 40 is employed instead of drawers 20/30, the latter requiring a pressurized gas as their combustion source. Thus, valve 17 remains in a second or blocked position whenever drawers 20/30 are withdrawn from space 26 and remains in the second position upon the application of drawer 40 therein.

What is claimed is:

1. A grill comprising a base and residing thereupon, a cooking surface, said cooking surface comprising at least one grate for supporting food to be cooked by said grill, a first removable drawer positionable in a drawer opening beneath said grate, said first removable drawer having at least one burner, a source of combustible fuel contained within a pressurized tank, said pressurized tank being housed within said base, a fuel line emanating from said pressurized tank to a control valve, said control valve having a first gas transmitting position facilitating said combustible fuel to be fed to said at least one burner and a second gas blocking position preventing said combustible fuel to be fed to said at least one burner, said control valve being capable of assuming said first gas transmitting position only if said first removable drawer has been fully positioned in said drawer opening beneath said cooking surface and a portion of said first removable drawer mechanically engages said control valve.

2. The grill of claim 1 wherein said control valve assumes said second gas blocking position upon removal of said first removable drawer from said drawer opening beneath said cooking surface causing said portion of said first removable drawer to be removed from said control valve.

3. The grill of claim 2 wherein said combustible fuel is blocked from being discharged from said pressurized tank when said control valve is in said second gas blocking position.

4. The grill of claim 1 further comprising a second removable drawer positionable in said drawer opening beneath said grate in the absence of said first removable drawer and said second removable drawer does not engage said control valve when said second removable drawer has been fully positioned in said drawer opening.

5. The grill of claim 4 wherein said second removable drawer is sized to receive an alternative combustible fuel to said combustible fuel of said pressurized tank.

6. The grill of claim 5 wherein said alternative combustible fuel comprises charcoal.

7. A grill comprising a base and residing thereupon, a cooking surface, said cooking surface comprising at least one grate for supporting food to be cooked by said grill, a first removable drawer positionable in a drawer opening beneath said grate, said first removable drawer having at least one burner, a source of combustible fuel contained within a pressurized tank, said pressurized tank being housed within said base, a fuel line emanating from said pressurized tank to a control valve, said control valve having a first gas transmitting position facilitating said combustible fuel to be fed to said at least one burner and a second gas blocking position preventing said combustible fuel to be fed to said at least one burner, said control valve being capable of assuming said first gas transmitting position only if said first removable drawer has been fully positioned in the drawer opening beneath said cooking surface, said grill further comprising a second removable drawer positionable in the drawer opening beneath said grate in the absence of said first removable drawer, said second removable drawer sized to receive an alternative combustible fuel to said combustible fuel of said pressurized tank.

8. The grill of claim 7 wherein said alternative combustible fuel comprises charcoal.

9. The grill of claim 7 wherein said control valve assumes said second gas blocking position upon removal of said first removable drawer from beneath said cooking surface.

* * * * *